Oct. 20, 1959  J. DOLZA  2,909,165
FUEL INJECTION SYSTEM
Filed Sept. 10, 1956
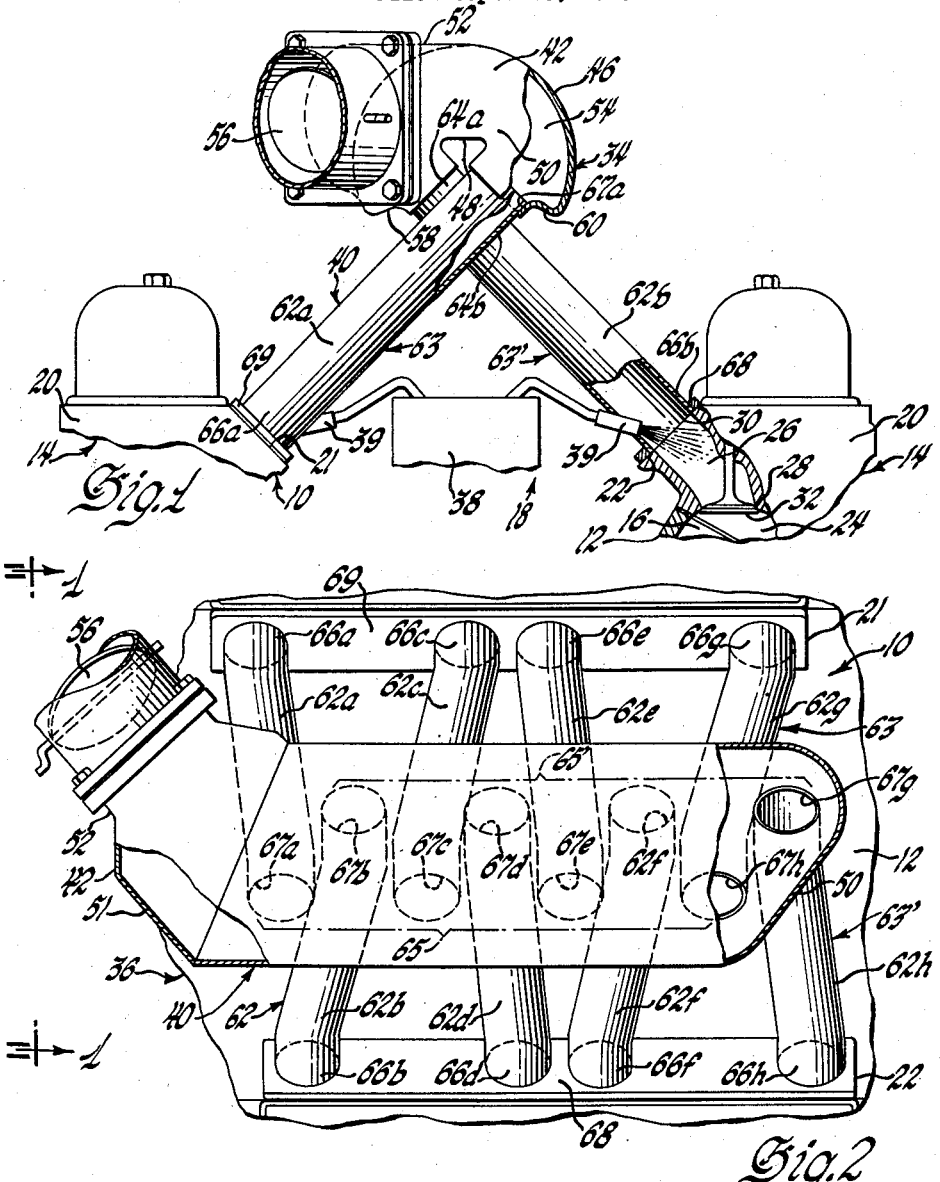
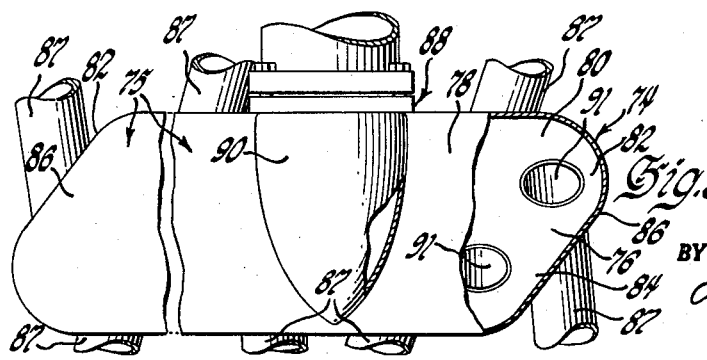
INVENTOR.
John Dolza
BY
L. D. Buick
ATTORNEY

United States Patent Office 2,909,165
Patented Oct. 20, 1959

2,909,165

FUEL INJECTION SYSTEM

John Dolza, Fenton, Mich., assignor to General Motors Corporation, Detroit, Mich., a corporation of Delaware Application September 10, 1956, Serial No. 608,935

3 Claims. (Cl. 123—52)

The present invention relates to charge forming means for an internal combustion engine and more particularly to an induction system and intake manifold therefor that will insure a high volumetric efficiency in the charging of the engine cylinders.

To obtain the maximum performance and economy for an internal combustion engine of the multi-cylinder type, it is essential that the charges for all of the cylinders be substantially identical in all respects. In the past numerous attempts have been made to accomplish this objective by providing an induction system having an intake manifold with the induction passages therein arranged in various configurations to facilitate the charging of the cylinders. Although these manifolds have produced acceptable results, the induction passages have presented resistances to the flow of the charges therethrough that materially limit the power developed by the engine and also the various resistances have not always been identical under all operating conditions and thus the charges delivered to the various cylinders have not necessarily been identical.

It is now proposed to provide an induction system for an internal combustion engine having an intake manifold in which all of the various induction passages are substantially identical to each other. This is to be accomplished by providing the intake manifold with a main body portion that forms a plenum chamber having an inlet adapted to draw air from the atmosphere and a plurality of tubes or ram pipes that interconnect the plenum chamber with the intake passages in the engine to form a plurality of substantially identical induction passages. These induction passages are shaped so that when the intake valves open and the charge is drawn into the cylinders the columns of air therein will acquire sufficient momentum to ram the charges into the cylinders and thereby dynamically supercharge the engine cylinders. In addition, the length, shape, etc. of these induction passages are arranged to tune the passages to tend to resonate during one or more engine operating conditions. During such conditions the surges of air resulting from the opening and closing of the intake valves will reinforce each other and thereby materially increase the ram effect.

More particularly the intake manifold is especially adapted for use on a V-type engine and the main body thereof is formed with an arcuate cover and a bottom having a pair of inclined surfaces that extend longitudinally thereof and substantially parallel to the banks of cylinders. The ram pipes have the upper ends attached to these inclined surfaces and they extend diagonally downward therefrom in a crossed relation to support the manifold and to communicate with the intake passages in the cylinder heads on the side of the engine opposite from the side that the upper ends intersect the plenum chamber.

In the one sheet of drawings:

Figure 1 is a fragmentary end view of an engine employing an induction system embodying the present invention.

Figure 2 is a fragmentary plan view of the engine of Figure 1.

Figure 3 is a fragmentary plan view of a modified form of an intake manifold embodying the present invention.

Referring to the drawings in more detail, the present invention may be employed on an internal combustion engine of any suitable design; however, it is particularly adapted for use on an engine 10 of the so-called V-type. This engine 10 may include a cylinder block 12 having a pair of angularly disposed banks 14 of cylinders 16 with an upwardly opening space 18 therebetween. A separate cylinder head 20 is secured to each of these banks 14 so that inclined faces 21 and 22 on the sides thereof extend longitudinally along the opposite sides of the space 18. Separate cavities 24 in the cylinder heads 20 register with the open ends of the cylinders 16 to thereby form combustion chambers. Individual intake passages 26 for each of the cylinders extend through the heads 20 with the inner ends thereof forming valve seats 28 communicating with the combustion chambers and the outer ends thereof forming intake ports 30 in the faces 21 and 22. Intake valves 32 are disposed in each of these seats 28 and actuated by the engine camshaft to time the flow of the charges into the cylinders 16.

In order to supply a combustion mixture of air and fuel for the cylinders, charge forming means 34 may be disposed above the space 18 between the two banks 14 of cylinders 16. This charge forming means 34 includes an air induction system 36 and a fuel injection system 38 responsive to the fuel demands of the engine 10 and effective to inject the metered fuel from the nozzles 39 and into the charge in proportion thereto.

The induction system 36 includes an intake manifold 40 having a main body 42 and a plurality of ram pipes 62 that extend downwardly therefrom. The top of the body 42 is formed by an arcuate cover 46 of substantially cylindrical shape and the bottom is formed by a floor 48. The opposite ends of the body 42 are closed by end walls 50 and 51 that cooperate with the cover 46 and floor 48 to form an air tight plenum chamber 54. A tube 52 projects longitudinally from the end wall 51 to form an inlet to the chamber 54. This inlet may be connected to any suitable source of induction air and it may include a throttle valve 56 for regulating the volume of the air flow and, if desired, a metering restriction such as a venturi for developing a metering signal for controlling the fuel injection system 38. It may thus be seen that the body 42 encloses a plenum chamber 54 in which all of the air must enter longitudinally through the inlet 52.

The floor 48 includes a pair of substantially plane portions 58 and 60 that are angularly disposed with respect to each other. Each of these portions 58 and 60 are preferably substantially parallel to the face on the cylinder head which is disposed on the side of the engine opposite therefrom, i.e. floor 58 is parallel to face 22 and floor 60 is parallel to face 21. The ram pipes 62 are all substantially identical with each other and preferably substantially straight. The individual ram pipes 62 are designated 62a to 62h inclusive depending upon the cylinder which they serve and they may be broken down into two separate groups 63 and 63'. One group 63 includes ram pipes 62a, 62c, 63e, and 62g which have the inlet ends 64a, 64c, 64e, and 64g respectively secured to plane portion 60 to open into the chamber 54. These inlet ends 64 are flared to create a row 65 of ports 67a, 67c, 67e, and 67g respectively along the portion 60. The outlet ends 66a, 66c, 66e, and 66g are secured to plate 69 on the side opposite from the inlet ends 64. The other group 63' of ram pipes 62b, 62d, 62f, and 62h have the inlet ends 64b, 64d, 64f, and 64h secured to plane portion 58 and opening into the plenum chamber 54 to form a row 65' of ports 67b, 67d, 67f, and 67h. The outlet ends 66b, 66d, 66f, and 66h of the pipes 62b, 62d, 62f, and 62h respectively are secured to plate 68 on the side opposite plane portion 58. These plates 68 and 69 are adapted to be secured to the faces 21 and 22 by any suitable means such as bolts so that the openings 70 formed by the outlet ends 66 of the ram pipes 62 will register with the intake ports 30 in the faces of the cylinder heads 20. Thus the ram pipes 62 and intake passages 26 will form induction passages 72 originating adjacent the floor 48 of the plenum chamber 54 and terminating adjacent the intake valves 32.

By making the faces 21 and 22 and the plane portions 58 and 60 of the floor 48 substantially parallel with each other, the inlet ends 64 and the outlet ends 66 of the ram pipes may be substantially normal to the axis of the pipes and the pipes may be substantially straight thereby greatly facilitating the ramming effect. In addition if the parallel faces and plane portions are on opposite sides of the engine, the ram pipes 62 in group 63 may extend diagonally in crossed relationship with the pipes in the other group 63'. This will permit inclining the ram pipes 62 and increasing the length thereof without a prohibitive increase in the overall height of the manifold 40 above the engine 10. It has been found that by employing an arcuate cover 46 the volume of the plenum chamber 54 may be greatly diminished to facilitate the throttle valve 56 in the inlet 52 retaining full control over the flow of the induction air, even at idle speed. At the same time such a cover 46 will give a cross sectional shape that will permit a uniform flow of air through the chamber while confining any surges of air in the ram pipes to the interior of the pipes.

As an alternative, the embodiment disclosed in Figure 3 may be employed. This embodiment of the intake manifold 74 is also adapted to be employed on a V-type engine 10 having angularly disposed banks 14 of cylinders 16. The manifold 74 includes a housing 75 having an elongated plenum chamber 76 enclosed by an arcuate cover 78, a floor 80 having a pair of inclined portions 82 and 84 substantially parallel to the faces 21 and 22 on the cylinder heads 20 on the opposite sides of the engine 10 and end walls 86. The ram pipes 87 are inclined and crossed with the upper ends 89 from ports 91 in the inclined portions 82 and 84 the same as in the first embodiment.

The inlet 88 to the plenum chamber in this embodiment comprises a tube 90 disposed in the center of the housing 75 to project substantially horizontally therefrom and substantially normal to the axis of the chamber 76. Thus, all of the induction air will enter the chamber 76 at the center thereof so as to be more nearly equidistant from all of the ports 67 formed by the ram pipes 62.

It may thus be seen that an intake manifold has been provided in which the opening of the intake valves will cause the columns of air in the induction passages to move toward the intake valves and to acquire sufficient momentum during the charging phase to materially increase the ramming effect in charging the cylinders. In addition, the length of the pipes may be chosen so that during one or more operating conditions the timing of the surges produced by the opening and closing of the intake valves will approach the natural periods of the induction passages and the surges will reinforce each other. When this resonating phenomenon is approached the surging columns of air will have even more momentum that will further increase the ramming of air into the cylinders to thereby dynamically supercharge the engine.

I claim:

1. An intake manifold for an internal combustion engine having a pair of angularly disposed banks of aligned cylinders, said intake manifold comprising a main body portion having a cover and a floor enclosing an elongated unobstructed plenum chamber, said floor including a pair of substantially plane inclined side portions, each of said side portions being inclined similar to the cylinders in the bank on the opposite side therefrom, an inlet for supplying varying quantities of induction air to said plenum chamber, a row of aligned ports in each of said inclined portions extending longitudinally therealong substantially parallel to said banks of cylinders, a first set of ram pipes having the upper ends thereof communicating with the ports in one of said inclined portions and terminating flush with said portion, the lower ends of said ram pipes being positioned to communicate with the cylinders in the bank on the opposite side thereof, a second set of ram pipes having the upper ends thereof communicating with the ports in the other of said inclined portions and terminating flush with said portion, the lower ends of said last mentioned ram pipes being positioned to communicate with the cylinders in said other bank.

2. An intake manifold for an internal combustion engine with a plurality of cylinders charged by intake passages having intake valves therein, said intake manifold comprising an elongated unobstructed chamber with a throttled inlet for receiving variable quantities of air, a separate induction passage for each of said cylinders, said induction passages having the inlet ends thereof communicating with said chamber to form two separate and parallel rows of ports and the outlet ends thereof being adapted to communicate with said intake passages, said induction passages being crossed and cooperating with said elongated chamber to provide means extending longitudinally of said chamber to prevent the flow of air in a straight line from one row to the other.

3. An intake manifold for an internal combustion engine having a pair of angularly disposed banks of cylinders each of which includes a plurality of cylinders charged by intake passages having intake valves therein, said intake manifold comprising an elongated unobstructed chamber with a throttled inlet for receiving varying quantities of air, separate ram pipe induction passages for each of said cylinders, said ram pipes forming two separate sets, the inlet ends of the pipes in each set being interconnected with said chamber to form a pair of spaced parallel rows of ports extending longitudinally along the opposite sides of said chamber, the outlet ends of said ram pipe induction passages being positioned to communicate with said intake passages for the cylinders in the bank on the side opposite from the upper ends thereof.

References Cited in the file of this patent

UNITED STATES PATENTS

| | | |
|---|---|---|
| 1,802,848 | Summers | Apr. 28, 1931 |
| 1,977,200 | Osterberg | Oct. 16, 1934 |
| 2,119,879 | Hoffman et al. | June 7, 1938 |
| 2,382,244 | Lundquist et al. | Aug. 14, 1945 |
| 2,772,668 | Nystrom et al. | Dec. 4, 1956 |
| 2,791,205 | Platner et al. | May 7, 1957 |